US012804733B2

(12) United States Patent
Ritieni et al.

(10) Patent No.: US 12,804,733 B2
(45) Date of Patent: Nov. 17, 2026

(54) SYSTEM AND METHOD FOR IMPROVING WIRELESS CONNECTION DURING POWER BACKOFF

(71) Applicant: ZEBRA TECHNOLOGIES CORPORATION, Lincolnshire, IL (US)

(72) Inventors: Giovanni P. Ritieni, Stony Brook, NY (US); Chu Pang Alex Ng, Markham (CA); Jialiang Tan, Toronto (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/526,773

(22) Filed: Dec. 1, 2023

(65) Prior Publication Data

US 2025/0185081 A1 Jun. 5, 2025

(51) Int. Cl.

| | |
|---|---|
| ***H04W 76/10*** | (2018.01) |
| ***H01Q 1/24*** | (2006.01) |
| ***H04B 1/3827*** | (2015.01) |
| ***H04B 1/48*** | (2006.01) |
| *H04W 48/16* | (2009.01) |

(52) U.S. Cl.

CPC ............ *H04W 76/10* (2018.02); *H01Q 1/245* (2013.01); *H04B 1/3838* (2013.01); *H04B 1/48* (2013.01); *H04W 48/16* (2013.01)

(58) Field of Classification Search

CPC ... H04W 52/283; H04W 52/42; H04W 52/38; H04W 52/367; H04W 76/10; H04W 48/16; H04W 52/36; H04B 1/3838; H04B 1/48

See application file for complete search history.

(56) References Cited

U.S. PATENT DOCUMENTS

| | | | | |
|---|---|---|---|---|
| 8,023,984 | B2 | 9/2011 | Jin et al. | |
| 9,716,995 | B2 * | 7/2017 | He | H04W 48/16 |
| 9,843,351 | B2 * | 12/2017 | Arrasvuori | H04W 4/21 |
| 11,394,417 | B1 | 7/2022 | Imana et al. | |
| 2008/0064393 | A1 | 3/2008 | Oommen et al. | |
| 2015/0116211 | A1 * | 4/2015 | Kim | G10L 15/22 345/156 |
| 2016/0073286 | A1 | 3/2016 | Wang et al. | |
| 2019/0140340 | A1 | 5/2019 | Ramasamy et al. | |
| 2021/0175919 | A1 | 6/2021 | Badic et al. | |
| 2023/0009163 | A1 | 1/2023 | Cui et al. | |
| 2023/0138665 | A1 * | 5/2023 | Lu | H04W 52/283 370/318 |
| 2024/0107431 | A1 * | 3/2024 | Shaw | H04L 5/0092 |
| 2025/0062784 | A1 * | 2/2025 | Song | H04B 1/3838 |

FOREIGN PATENT DOCUMENTS

| | | | | |
|---|---|---|---|---|
| CN | 112492521 A | * | 3/2021 | H04W 36/00837 |
| CN | 116866943 A | * | 10/2023 | |
| KR | 102208304 B1 | * | 1/2021 | |

OTHER PUBLICATIONS

International Search Report and Written Opinion for International Patent Application No. PCT/US2024/057406 mailed on Jan. 28, 2025.

* cited by examiner

*Primary Examiner* — Gary Mui

(57) ABSTRACT

A method is provided comprising: detecting an interaction of a user with a communication device, identifying a modality of the interaction of the user with the communication device, and adjusting a link establishment characteristic of the communication device based on the modality of the interaction.

19 Claims, 3 Drawing Sheets

SYSTEM AND METHOD FOR IMPROVING WIRELESS CONNECTION DURING POWER BACKOFF

BACKGROUND

To limit radio frequency (RF) exposure for a user, wireless communication devices reduce the transmit power when they are disposed in close vicinity to a user's head, for example. This typically degrades the connection between the wireless communication device and a base station.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
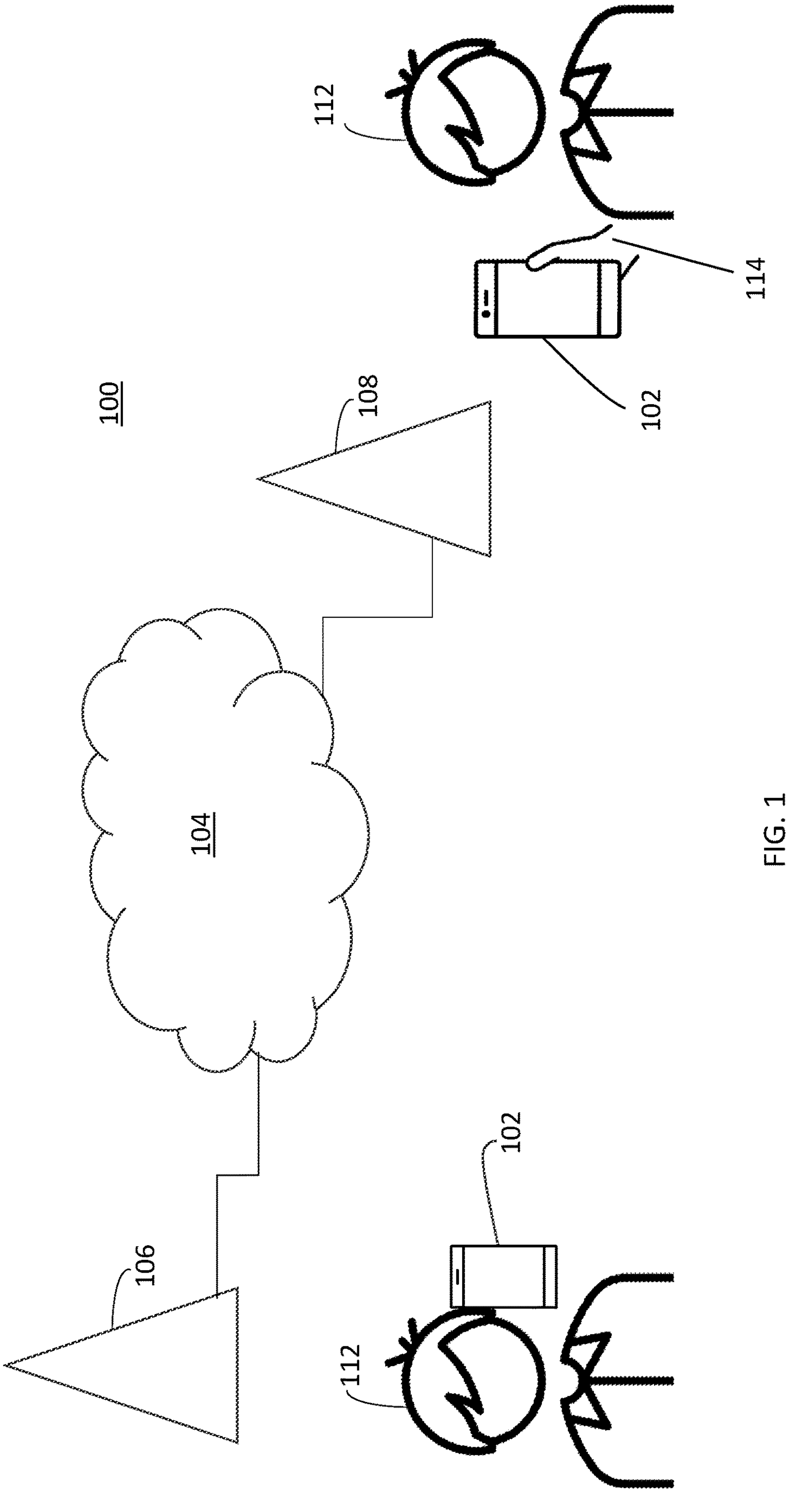
FIG. 1 is a schematic diagram of an example system for improving wireless connection during power backoff.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: detecting an interaction of a user with a communication device, identifying a modality of the interaction of the user with the communication device, and adjusting a link establishment characteristic, such as a roaming parameter, of the communication device based on the modality of the interaction.

Additional examples disclosed herein are directed to a communication device comprising: memory storing computer executable instructions, a controller, operatively connected to the memory, the controller configured to execute the instructions and cause the communication device to: detect an interaction of a user with the communication device, identify a modality of the interaction of the user with the communication device, and adjust a link establishment characteristic, such as a roaming parameter, of the communication device based on the modality of the interaction.

FIG. 1 depicts a system 100 for improving wireless connection during power backoff in accordance with the teachings of this disclosure. The system 100 includes a communication device 102 connected to a network 104.

In embodiments, the communication device 102 is a mobile computing device, such as a mobile computer, a mobile phone, a tablet, a laptop or the like. As noted above, the device 102 is connected to the network 104, which may be deployed for wireless communications within a facility, such as a transportations and logistics facility, a warehouse, a retail establishment, or other facility. Accordingly, one embodiment of the network 104 is a wireless local area network (WLAN), such as a network complying with IEEE 802.11 family of standards and deployed by one or more base stations, such as access points 106, 108. Alternatively or in addition, the network 104 is a cellular network, such as a 4G, 5G, and/or Citizens Broadband Radio Service (CBRS) wireless wide area network (WWAN) or the like. In such an embodiment, base stations 106, 108 are WWAN (e.g., cellular-based) base stations.

Figure 2A:
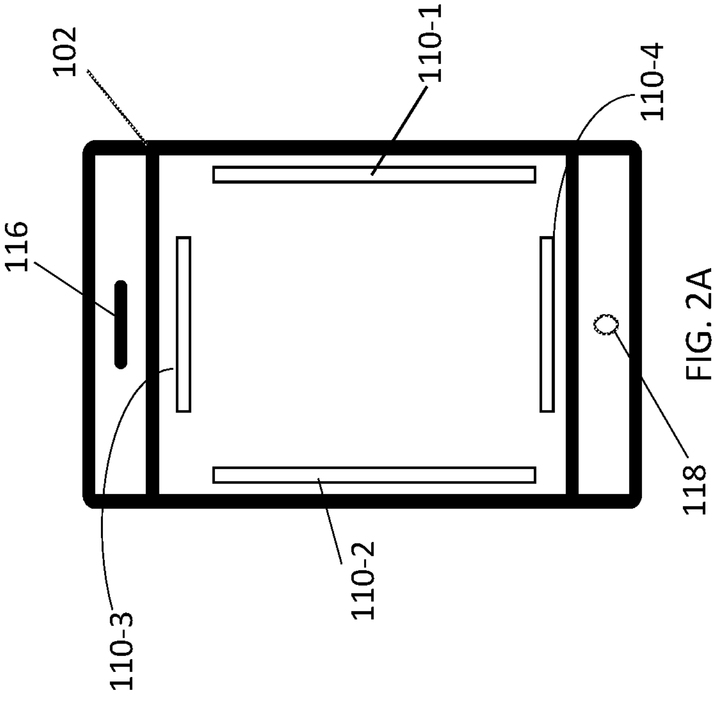
FIG. 2A is a block diagram of example sensor locations of the computing device of FIG. 1.

Referring to FIG. 2A, in an embodiment, the communication device 102 includes a plurality of specific absorption rate (SAR) sensors 110 disposed in various positions on the communications device 102 that, when activated, indicate a modality of the user's physical interaction with the communication device 102. For example, when one or more SAR sensors 110-1, 110-2 disposed at the side(s) of the device 102, are activated without activation of the SAR sensors 110-3 and/or 110-4, respectively disposed near the receiver 116 and microphone 118, the communication device 102 determines that it is being held away from the user's head 112 in the user's hands 114 (FIG. 1). On the other hand, when one or more SAR sensors 110-3, 110-4 disposed near the receiver 116 and/or microphone 118 are activated, the communication device 102 determines that it is being held in proximity to the user's head 112. Alternatively or in addition, the communication device 102 determines that it is being held next to the user's head 112 when a receiver 116 of the device 102 is activated, such as during a voice session that does not use device 102 in speakerphone mode. In an embodiment, the communication device 102 determines that it is being held away from the user's head when the device 102 is being used in a speakerphone mode. In one embodiment, the device 102 also uses the orientation of its axes, received from its inertial measurement unit (IMU), for example in conjunction with the above inputs, including whether the device is being used in speakerphone mode for instance, to determine the modality of the user's physical interaction with the device 102. In an embodiment, the communication device 102 stores a lookup table of device orientation ranges received from the IMU that correspond to different modalities of user's physical interaction with the device 102. Alternatively or in addition, the device 102 determines that it is being held in the user's hands and away from the user's head when its touch panel and display are active, for example. Conversely, the device 102 determines that it is being held next to the user's head based on activation of the proximity sensor of the device 102, which deactivates the display and touch screen.

As those of ordinary skill in the art will realize, radio frequency (RF) signal degradation occurs due to signal absorption by the user's head when the user holds the communication device 102 next to his head 112. Furthermore, when the device 102 determines that it is being held next to the user's head, to reduce the amount of RF signal absorbed by the user's head 112, the communication device 102 backs off or reduces the transmit power, which further degrades signal strength.

Therefore, in accordance with an embodiment of the present disclosure, to compensate for the signal degradation due to RF absorption and/or transmit power backoff when the detected modality of the user's physical interaction with the communication device 102 indicates that the user is holding the device 102 next to his head, for example, the communication device 102 adjusts a predetermined roaming threshold to another roaming threshold corresponding to a received signal strength (RSSI) value that is stronger than an RSSI value of the original roaming threshold. For example, the device 102 changes to a roaming threshold that is stronger than a previous roaming threshold by a predetermined value, such as by 10 db In this case, for instance, the device 102 changes from a roaming threshold of −65 dbm to a roaming threshold of −55 dbm, which initiates roaming to a base station having a stronger signal strength sooner and thereby reduces the effect of signal absorption and/or transmit power backoff described above. In an embodiment, the communication device 102 adjusts the roaming threshold by modifying a corresponding parameter stored in its firmware register or in software.

In embodiments, the roaming threshold is restored to the original value when, for example, the interaction of the user with the communication device is no longer detected, or when the modality of the interaction of the user with the communication device has changed (for instance, from next-to-head to away-from-head use). To prevent unnecessary roaming when the signal strength and/or voice quality continues to be high despite transmit power backoff and/or signal attenuation by a body part of the user, the communication device 102 adjusts the roaming parameter when the received signal strength falls below a predetermined threshold. Alternatively or in addition, despite transmit power backoff and/or signal attenuation by a body part of the user, the roaming parameter is adjusted after the communication device 102 detects at least one base station 106, 108 with a stronger RSSI than a current base station.

Additional examples of adjustment of a link establishment characteristic further include one or more of: modifying a roaming scan trigger (e.g., to a higher RSSI value), initiating a scan for one or more base stations or access points to identify base stations or access points with higher RSSI, updating a scanning list of one or more base stations or access points, modifying a number of lost beacons parameter to initiate a base station or access point scan (e.g., lowering a threshold of lost beacons over a predetermined time period to accelerate initiation of a scan), modifying a method of scanning for base stations or access points, including switching from scanning one frequency band to scanning another frequency band and/or switching from scanning one set of channels on a frequency band to scanning another set of channels on the same frequency band.

Alternatively or in addition to modifying roaming parameter(s), adjustment of a link establishment characteristic includes adjustment of parameter(s) related to establishing a new communication session and/or re-establishing a session, such as due to a dropped call, among other examples. For instance, when a communication session via an initial access point or base station has been prematurely terminated (or could not be established) in view of the reduction in signal strength when the user is holding the communication device next to his or her head, the communication device adjusts parameters relating to a threshold signal strength required to establish a new link (e.g., by increasing the minimum RSSI value of a base station or access point with which to establish a new link).

Figure 2B:
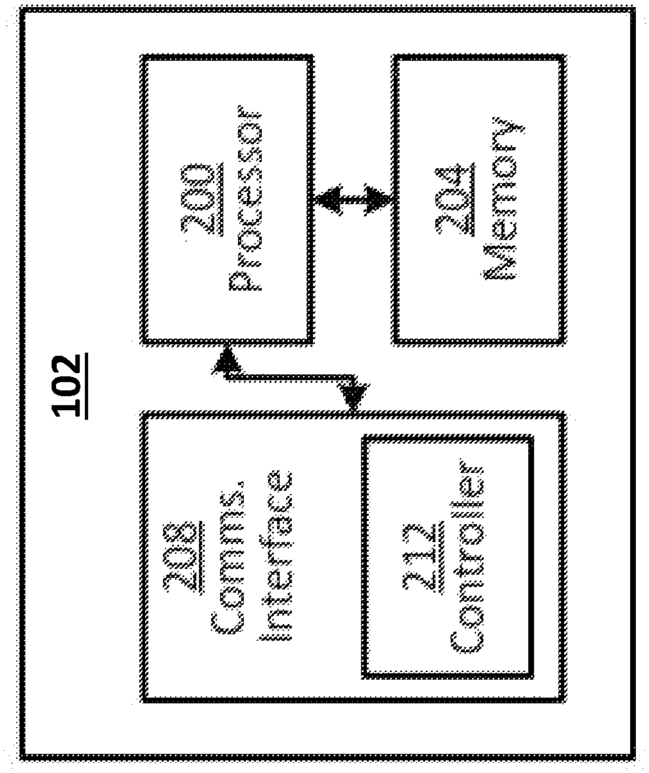
FIG. 2B is a block diagram of certain internal hardware components of the computing device of FIG. 1.

Referring to FIG. 2B, certain internal components of the computing device 102 are illustrated. The device 102 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits, including special purpose circuitry, such as FPGAs, ASICs, or the like. The memory 204 stores computer-readable instructions for execution by the processor 200, including one or more applications, which, when executed, configure the processor 200 to perform the various functions of the device 102.

The device 102 further includes a communications interface 208 enabling the device 102 to exchange data with other computing devices. The communications interface 208 is interconnected with the processor 200. The communications interface 208 includes a controller 212, and one or more antennas, transmitters, and receivers (not shown), to allow the device 102 to communicate with base stations 106, 108.

The controller 212 may be a micro-controller, a microprocessor, or other suitable device capable of executing computer-readable instructions to control the components, such as the antennae, transmitters, receivers, and the like, of the communications interface 208 to perform the functionality described herein. The controller 212 may comprise one or more integrated circuits, such as specially configured Field Programmable Gate Arrays (FPGAs), Application-Specific Integrated Circuits (ASICs), or the like, and may include and/or be interconnected with a non-transitory computer-readable storage medium storing computer-readable instructions, which, when executed configure the controller 212 and/or the communications interface 208 to perform the functionality described herein. In particular, the controller 212 may adjust a roaming parameter of the communication device 102 based on the modality of the user's interaction with the device 102, as described with reference to FIGS. 1, 2A above.

The device 102 may further include one or more input and/or output devices (not shown) suitable to allow a user to interact with the device 102. The input devices may include one or more buttons, keypads, touch-sensitive display screens or the like for receiving input from the user. The output devices may further include one or more display screens, sound generators, vibrators, or the like for providing output or feedback to the user.

Figure 3:
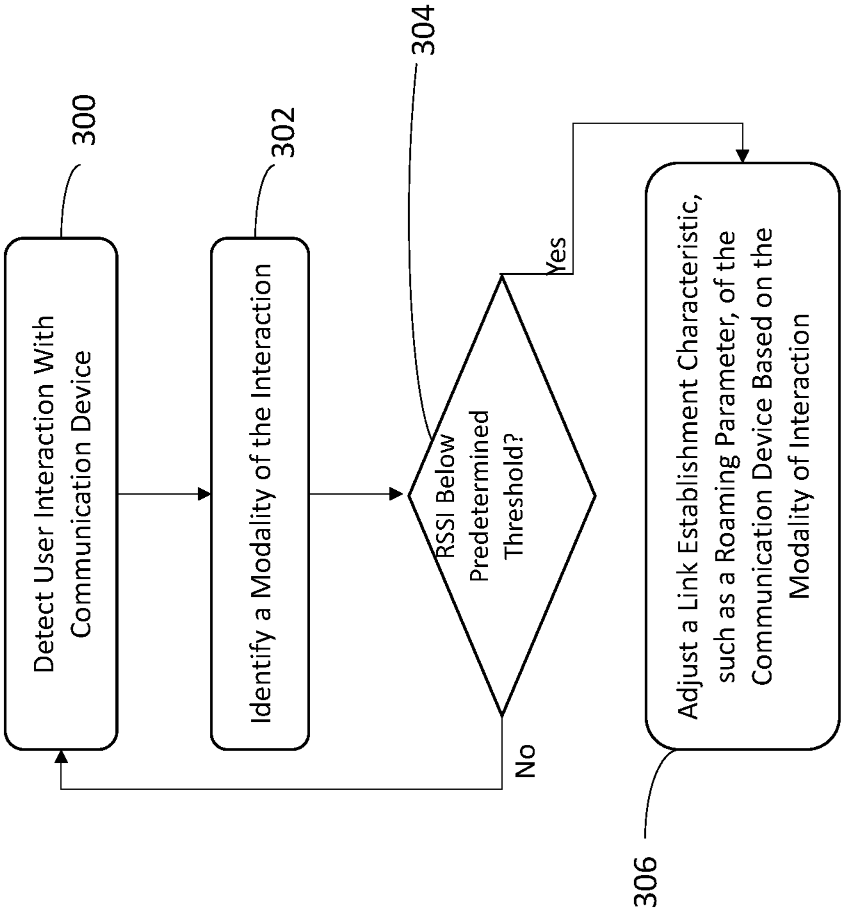
FIG. 3 is a flowchart of a method for improving wireless connection during power backoff.

Referring to FIG. 3, a method for improving a wireless connection during power backoff associated with reducing a specific absorption rate for the user of the communication device 102 is described. In step 300, the communication device 102 detects user's interaction. In step, 302, in response to the detection, the device 102 identifies a modality of the user's interaction, as described in FIG. 2A above. In steps 304, 306, when next-to-head modality is detected and when the RSSI threshold is below a predetermined threshold (e.g., below −60 dbm), the device 102 adjusts a roaming threshold to an RSSI value that is stronger than the original roaming threshold (e.g., from −65 dbm to −55 dbm). Otherwise, the device 102 continues to monitor for interaction with the user by returning to the detection step 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:

detecting an interaction of a user with a communication device;

identifying a modality of the interaction of the user with the communication device; and adjusting a link establishment characteristic of the communication device based on the modality of the interaction, wherein identifying the modality of the interaction of the user with the communication device is based on an activation location of at least one specific absorption rate (SAR) sensor disposed on the communication device.

2. The method of claim 1 further comprising detecting the interaction via the at least one SAR sensor.

3. The method of claim 1 wherein the link establishment characteristic is selected from the group consisting of a roaming parameter, and a new communication session establishment parameter.

4. The method of claim 3 wherein the roaming parameter comprises a first roaming threshold.

5. The method of claim 4 further comprising adjusting the first roaming threshold to a second roaming threshold having a received signal strength indication (RSSI) value stronger than an RSSI value of the first roaming threshold to compensate for at least one of signal absorption by a body part of the user or transmit power backoff by the communication device.

6. The method of claim 3 wherein the roaming parameter is adjusted by the communication device by modifying a firmware register setting.

7. The method of claim 1, wherein adjusting the link establishment characteristic is selected from the group consisting of: modifying a roaming scan trigger, initiating a scan for one or more access points, updating a scanning list of one or more access points, modifying a number of lost beacons parameter to initiate an access point scan, modifying a method of scanning for access points, switching from scanning a first band to scanning a second band, and switching from scanning a first set of channels on the first band to a second set of channels on the first band.

8. The method of claim 1 wherein identifying the modality of the interaction of the user with the communication device is based on detecting activation of an audio receiver of the communication device.

9. The method of claim 1 wherein identifying the modality of the interaction of the user with the communication device is based on an accelerometer sensor of the communication device.

10. The method of claim 1 wherein the communication device is selected from the group consisting of a wireless local area network (WLAN) communication device and a wireless wide area network (WWAN) communication device.

11. The method of claim 1 further comprising restoring the link establishment characteristic when one of: (a) the interaction of the user with the communication device is no longer detected, and (b) the modality of the interaction of the user with the communication device has changed.

12. The method of claim 1 wherein the link establishment characteristic is adjusted when a received signal strength indication (RSSI) is below a predetermined threshold.

13. The method of claim 1 wherein the link establishment characteristic is adjusted when the communication device detects at least one base station with a stronger received signal strength indication (RSSI) than a current base station.

14. The method of claim 1, wherein a plurality of specific absorption rate (SAR) sensors are disposed on different locations of the communication device and identifying the modality of the interaction of the user with the communication device is based on which of the locations of the plurality of SAR sensors are activated and which of the locations of the plurality of SAR sensors have not been activated.

15. A communication device comprising:

memory storing computer executable instructions;

a controller, operatively connected to the memory, the controller configured to execute the instructions and cause the communication device to:

detect an interaction of a user with the communication device;

identify a modality of the interaction of the user with the communication device; and adjust a link establishment characteristic of the communication device based on the modality of the interaction, wherein the instructions cause the communication device to identify the modality of the interaction of the user with the communication device based on an activation location of the at least one specific absorption rate (SAR) sensor disposed on the communication device.

16. The communication device of claim 15 wherein the instructions further cause the communication device to detect the interaction via the at least one SAR sensor.

17. The communication device of claim 15 wherein the link establishment characteristic is selected from the group consisting of a roaming parameter, and a new communication session establishment parameter.

18. The communication device of claim 15, wherein adjustment of the link establishment characteristic is selected from the group consisting of: modify a roaming scan trigger, initiate a scan for one or more access points, update a scanning list of one or more access points, modify a number of lost beacons parameter to initiate an access point scan, modify a method of scanning for access points, switch from scanning a first band to scanning a second band, and switch from scanning a first set of channels on the first band to a second set of channels on the first band.

19. The communication device of claim 15, further comprising:

a plurality of specific absorption rate (SAR) sensors disposed on different locations of the communication device, wherein the instructions cause the communication device to identify the modality of the interaction of the user with the communication device is based on which of the locations of the plurality of SAR sensors are activated and which of the locations of the plurality of SAR sensors have not been activated.

* * * * *